(12) United States Patent
Heckmeier et al.

(10) Patent No.: US 6,808,764 B2
(45) Date of Patent: Oct. 26, 2004

(54) LIQUID-CRYSTALLINE MEDIUM HAVING A HIGH BIREFRINGENCE AND IMPROVED UV STABILITY

(75) Inventors: Michael Heckmeier, Hemsbach (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/358,400

(22) Filed: Feb. 5, 2003

(65) Prior Publication Data

US 2003/0228426 A1 Dec. 11, 2003

(30) Foreign Application Priority Data

Feb. 5, 2002 (DE) .......................... 102 04 607

(51) Int. Cl.$^7$ .................. C09K 19/12; C09K 19/20; C09K 19/30
(52) U.S. Cl. .............. 428/1.1; 252/299.63; 252/299.66; 252/299.67
(58) Field of Search ...................... 428/1.1; 252/299.63, 252/299.66, 299.67

(56) References Cited

U.S. PATENT DOCUMENTS

2003/0071244 A1 * 4/2003 Klasen-Memmer et al. .......... 252/299.66
2003/0098443 A1 * 5/2003 Manabe et al. ........ 252/299.66
2003/0222245 A1 * 12/2003 Klasen-Memmer et al. ..... 252/299.66

FOREIGN PATENT DOCUMENTS

DE 10218975 * 12/2002

OTHER PUBLICATIONS

English abstract of DE–10218975 by Derwent, 2003.*

* cited by examiner

Primary Examiner—Shean C. Wu
(74) Attorney, Agent, or Firm—Millen, White, Zelano & Branigan, P.C.

(57) ABSTRACT

A liquid-crystalline medium comprises the compound of the formula (I):

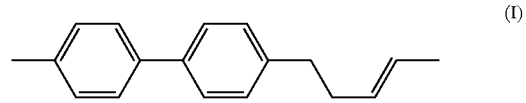

generally in amounts from 1 to 30% by weight, preferably from 2 to 20% by weight, particularly preferably from 3 to 10% by weight, and further liquid-crystalline compounds.

23 Claims, No Drawings

LIQUID-CRYSTALLINE MEDIUM HAVING A HIGH BIREFRINGENCE AND IMPROVED UV STABILITY

The present invention relates to a liquid-crystalline medium, and to electro-optical displays containing this medium.

Liquid crystals are used, in particular as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must generally have good chemical and thermal stability and good stability to electric fields and electromagnetic radiation. Furthermore, the liquid-crystal materials should have low viscosity and give short response times, low threshold voltages and high contrast in the cells.

They should furthermore have a suitable mesophase, for example a nematic mesophase for the abovementioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, liquid-crystalline media having large positive dielectric anisotropy, broad nematic phase range, high resistivity, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, besides passive elements such as varistors or diodes, active elements such as transistors. This case is then referred to as an "active matrix".

In the promising TFT (thin film transistor) displays, the electro-optical effect utilized is usually the TN effect. A distinction is made between TFTs comprising compound semiconductors, for example CdSe, or TFTs based on polycrystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel. The TFT displays usually operate as TN cells with crossed polarizers in transmission and are backlit.

MLC displays of this type are used as displays in notebook computers, for televisions (pocket TVs) or in automobile or aircraft construction. Besides problems regarding the angle dependence of the contrast and the response times, difficulties also arise in these MLC displays due to inadequate resistivity of the liquid-crystal mixtures. With decreasing resistance, the contrast of an MLC display drops, and the problem of "image sticking" can occur. Since the resistivity of the liquid-crystal mixture generally drops over the life of an MLC display owing to interaction with the interior surfaces of the display, a high (initial) resistance is very important in order to obtain acceptable service lives. In particular in the case of mixtures having a low threshold voltage, it was hitherto impossible to achieve very high resistivities, since liquid-crystalline materials having a high positive dielectric anisotropy $\Delta\varepsilon$ in general also have a relatively high electrical conductivity. It is furthermore important that the resistivity increases as little as possible with increasing temperature and after heating and/or UV exposure. To achieve short display response times, the mixtures must furthermore have a small rotational viscosity. To be able to use the displays even at low temperatures, for example for outdoor, automobile or avionics applications, it is required that crystallization and/or smectic phases do not occur even at low temperatures, and that the temperature dependence of the viscosity is as low as possible.

To this end, liquid-crystalline media are desired which have the following properties:

expanded nematic phase range, in particular down to low temperatures, and low temperature dependence of the viscosity for use of the displays even at low temperatures;

high resistance to UV radiation for a long life of the displays;

high positive dielectric anisotropy $\Delta\varepsilon$ for a low threshold voltage $V_{th}$;

low rotational viscosity $\gamma_1$ for short response times.

It is an object of the invention to provide liquid-crystalline media for IPS, MLC, TN or STN displays, especially for IPS displays, which have very high resistivities, low threshold voltages and short response times while maintaining the other boundary conditions.

To be able to reduce layer thicknesses in IPS displays to e.g. 2 to 3 μm, liquid-crystal mixtures having a high optical birefringence Δn are desirable. The aim of the reduction of the layer thicknesses is to reduce the response time and render the IPS displays video-capable. At the same time, new display filling methods lead to higher UV exposure of the liquid-crystal mixtures.

It is therefore also a particular object of the invention to provide liquid-crystal mixtures having a high birefringence Δn and improved UV stability for IPS displays.

The object is achieved by a liquid-crystalline medium comprising the compound of the formula (I):

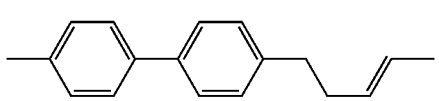

(I)

The liquid-crystalline medium of the invention generally contains from 1 to 30% by weight, preferably from 2 to 20% by weight, particularly preferably from 3 to 30% by weight, of the compound of the formula (I).

Preferred liquid-crystalline media comprise
a) from 3 to 10% by weight of the compound of the formula (I),
b) from 10 to 50% by weight of one or more compounds of the general formula (II)

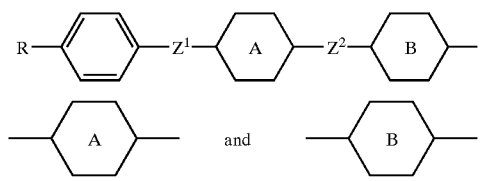

in which

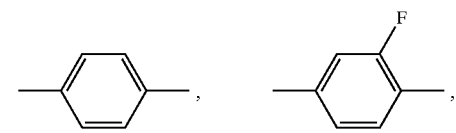

are each, independently of one another:

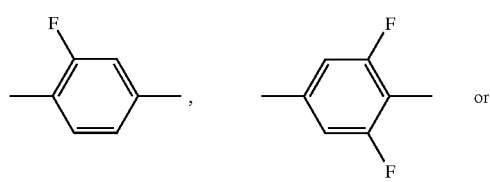

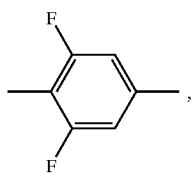

$Z^1$, $Z^2$ are each, independently of one another, a single bond, —CH$_2$—CH$_2$—, CF$_2$CF$_2$, —COO— or —CF$_2$O—, X is F, Cl, —OCF$_3$ or —OCF$_2$CF$_3$, preferably F or —OCF$_3$, and R is H or an alkyl or alkenyl radical having 1 to 15 carbon atoms and 2 to 15 carbon atoms, respectively, which is unsubstituted, monosubstituted by —CN or —CF$_3$ or at least monosubstituted by halogen, where one or more —CH$_2$— groups in these radicals may, in each case independently of one another, be replaced by —O—, —S—,

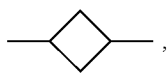

—CO—, —COO—, —OCO— or —OCOO— in such a way that O atoms are not linked directly to one another, c) from 10 to 50% by weight of one or more compounds of the general formula (III), and/or (IV):

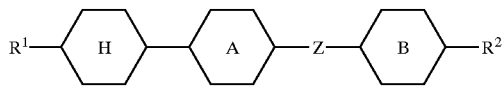

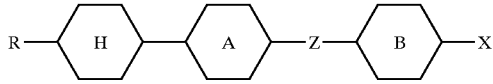

in which

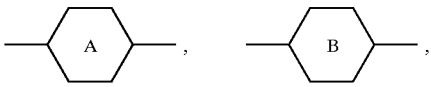

R and X are as defined above, $R^1$ and $R^2$ are each independently as defined for R, and Z is as defined for $Z^1$, d) from 10 to 40% by weight of one or more compounds of the general formulae (V) and/or (VI):

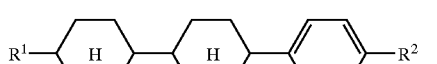

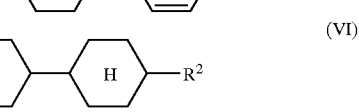

in which $R^1$ and $R^2$ are as defined above, and e) from 0 to 15% by weight of one or more further liquid-crystalline compounds.

In those compounds of the general formula (II) which are preferably used as component b):

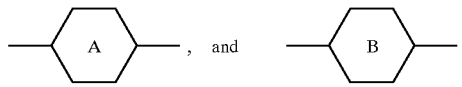

are each, independently of one another:

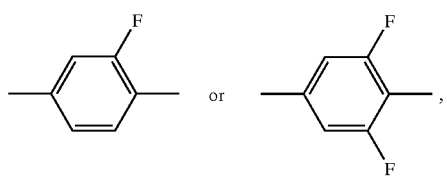

In further compounds of the general formula (II) which are preferably used as component b), at least one of the groups $Z^1$ or $Z^2$ is a single bond, and preferably both groups $Z^1$ and $Z^2$ are a single bond.

In the general formulae (II), (III), (IV), (V) and (VI), R, $R^1$ and $R^2$ can each be, independently of one another, a straight-chain or branched alkyl and/or alkoxy radical having 1 to 15 carbon atoms. It is preferably straight-chain, has 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexoxy or heptoxy, furthermore octyl, nonyl, decyl, undecyl, dodecyl, tridecyl, tetradecyl, pentadecyl, octoxy, nonoxy, decoxy, undecoxy, dodecoxy, tridecoxy or tetradecoxy.

R, $R^1$ and $R^2$ can each be oxaalkyl, preferably straight-chain 2-oxapropyl (=methoxymethyl), 2-(=ethoxymethyl) or 3-oxabutyl (=methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

R, $R^1$ and $R^2$ can each be a straight-chain or branched alkenyl radical having 2 to 15 carbon atoms. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

R, $R^1$ and $R^2$ can each be an alkyl radical having 3 to 15 carbon atoms, preferably having 3 to 7 carbon atoms, in which one $CH_2$ group has been replaced by —O— and one has been replaced by —CO—, these preferably being adjacent. This radical thus contains an acyloxy group —CO—O— or an oxycarbonyl group —O—CO—. It is preferably straight-chain and has 2 to 6 carbon atoms. Accordingly, it is particularly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

R, $R^1$ and $R^2$ can each be an alkyl radical having 3 to 15 carbon atoms, in which one $CH_2$ group has been replaced by unsubstituted or substituted —CH=CH— and an adjacent $CH_2$ group has been replaced by CO or CO—O or O—CO, in which case this can be straight-chain or branched. It is preferably straight-chain and has 4 to 13 carbon atoms. It is particularly preferably acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

R, $R^1$ and $R^2$ can each be an alkyl or alkenyl radical having 1 to 15 carbon atoms and 2 to 15 carbon atoms, respectively, which is monosubstituted by —CN or —$CF_3$, this radical preferably being straight-chain. The substitution by CN or $CF_3$ is in any position.

R, $R^1$ and $R^2$ can each be an alkyl or alkenyl radical having 1 to 15 carbon atoms and 2 to 15 carbon atoms, respectively, which is at least monosubstituted by halogen, this radical preferably being straight-chain and halogen preferably being F or Cl. In the case of polysubstitution, halogen is preferably F. The resulting radicals also include perfluorinated radicals. In the case of monosubstitution, the fluoro or chloro substituent can be in any desired position, but is preferably in the ω-position.

R, $R^1$ and $R^2$ can each be a straight-chain or branched alkyl radical in which two or more $CH_2$ groups have been replaced by —O— and/or —CO—O—. It is preferably branched and has 3 to 12 carbon atoms. It is particularly preferably biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

Hereinbelow, some of the compounds of the general formulae (II)–(VI) are represented by acronyms which have the following meanings:

"C" 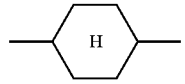

"P" 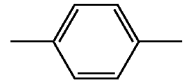

"G" 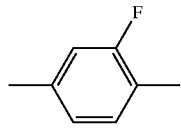

"GI" 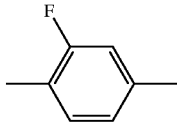

"U" 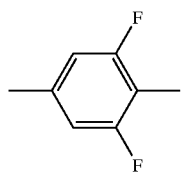

"UI" 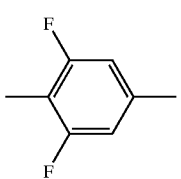

"V" R, $R^1$ or $R^2$=—CH=$CH_2$

"VI" R, $R^1$ or $R^2$=—CH=CH—$C_2H_{2l+1}$

"kVI" $R^1$ or $R^2$=—$C_kH_{2k}$—CH=CH—$C_2H_{2l+1}$

"n" R or $R^1$=—$C_nH_{2n+1}$

"m" $R^2$=—$C_mH_{2m+1}$

"F" X=—F

"$OCF_3$" X=—$OCF_3$

"Z" —COO—

"Q" —$CF_2O$—

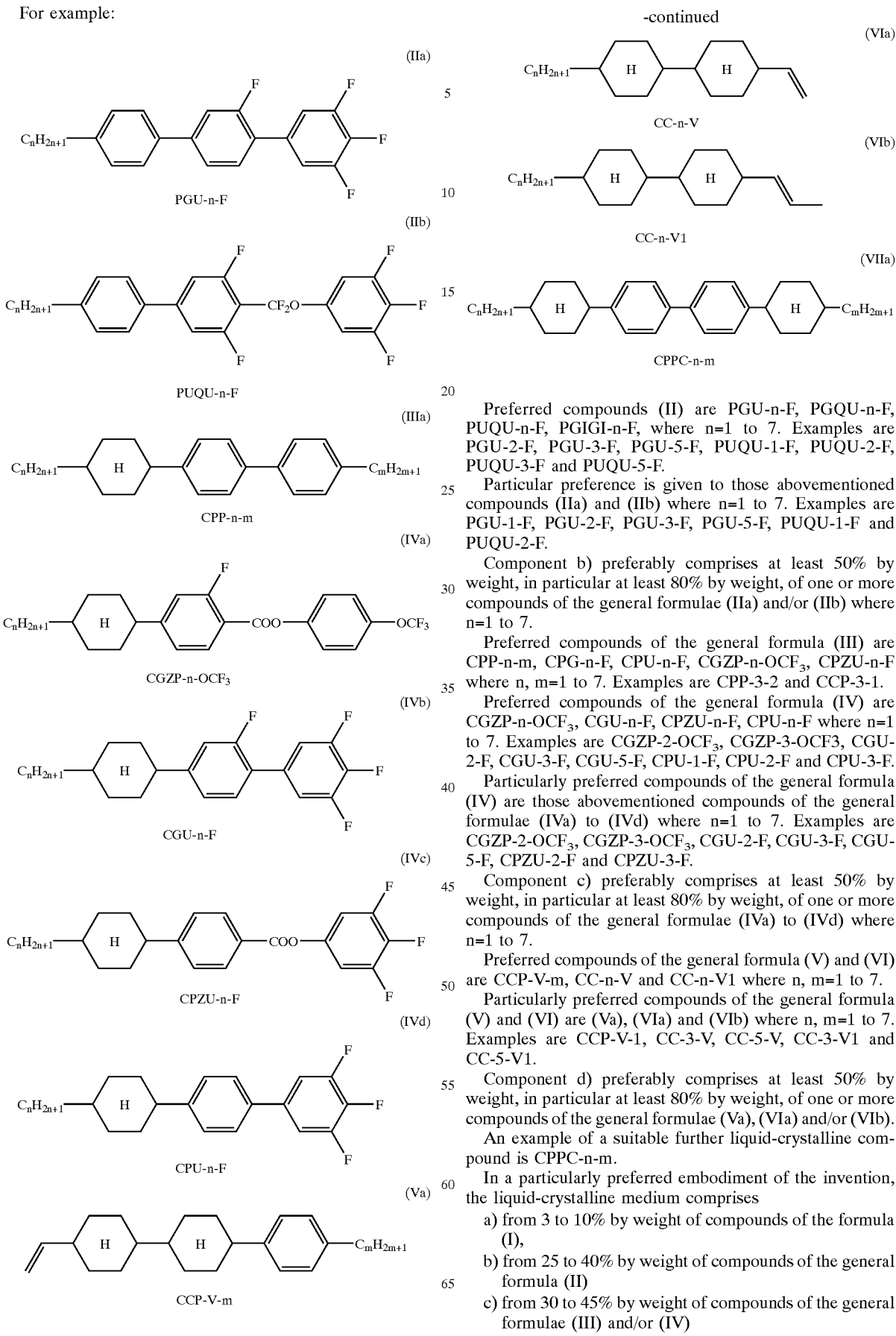

Preferred compounds (II) are PGU-n-F, PGQU-n-F, PUQU-n-F, PGIGI-n-F, where n=1 to 7. Examples are PGU-2-F, PGU-3-F, PGU-5-F, PUQU-1-F, PUQU-2-F, PUQU-3-F and PUQU-5-F.

Particular preference is given to those abovementioned compounds (IIa) and (IIb) where n=1 to 7. Examples are PGU-1-F, PGU-2-F, PGU-3-F, PGU-5-F, PUQU-1-F and PUQU-2-F.

Component b) preferably comprises at least 50% by weight, in particular at least 80% by weight, of one or more compounds of the general formulae (IIa) and/or (IIb) where n=1 to 7.

Preferred compounds of the general formula (III) are CPP-n-m, CPG-n-F, CPU-n-F, CGZP-n-OCF$_3$, CPZU-n-F where n, m=1 to 7. Examples are CPP-3-2 and CCP-3-1.

Preferred compounds of the general formula (IV) are CGZP-n-OCF$_3$, CGU-n-F, CPZU-n-F, CPU-n-F where n=1 to 7. Examples are CGZP-2-OCF$_3$, CGZP-3-OCF3, CGU-2-F, CGU-3-F, CGU-5-F, CPU-1-F, CPU-2-F and CPU-3-F.

Particularly preferred compounds of the general formula (IV) are those abovementioned compounds of the general formulae (IVa) to (IVd) where n=1 to 7. Examples are CGZP-2-OCF$_3$, CGZP-3-OCF$_3$, CGU-2-F, CGU-3-F, CGU-5-F, CPZU-2-F and CPZU-3-F.

Component c) preferably comprises at least 50% by weight, in particular at least 80% by weight, of one or more compounds of the general formulae (IVa) to (IVd) where n=1 to 7.

Preferred compounds of the general formula (V) and (VI) are CCP-V-m, CC-n-V and CC-n-V1 where n, m=1 to 7.

Particularly preferred compounds of the general formula (V) and (VI) are (Va), (VIa) and (VIb) where n, m=1 to 7. Examples are CCP-V-1, CC-3-V, CC-5-V, CC-3-V1 and CC-5-V1.

Component d) preferably comprises at least 50% by weight, in particular at least 80% by weight, of one or more compounds of the general formulae (Va), (VIa) and/or (VIb).

An example of a suitable further liquid-crystalline compound is CPPC-n-m.

In a particularly preferred embodiment of the invention, the liquid-crystalline medium comprises a) from 3 to 10% by weight of compounds of the formula (I),
b) from 25 to 40% by weight of compounds of the general formula (II)
c) from 30 to 45% by weight of compounds of the general formulae (III) and/or (IV)

d) from 18 to 30% by weight of compounds of the general formulae (V) and/or (VI), and e) from 0 to 10% by weight of further liquid-crystalline compounds.

The compounds of the formula (I) and of the general formulae (II) to (VI) are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail.

The invention also relates to electro-optical displays, such as STN or MLC displays, in particular IPS displays, having two plane-parallel outer plates, which, together with a frame, form a cell, integrated non-linear elements for switching individual pixels on the outer plates, and a nematic liquid-crystal mixture of positive dielectric anisotropy and high resistivity which is located in the cell, which contain the liquid-crystalline media according to the invention, and to the use of these media for electro-optical displays.

The liquid-crystal mixtures according to the invention allow a significant extension of the parameter latitude which is available.

The achievable combinations of clearing point, rotational viscosity, optical anisotropy, threshold voltage, birefringence and UV stability are superior to current prior art materials. The liquid-crystalline media according to the invention are therefore particularly suitable for IPS displays.

The construction of the STN or MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM and IPS displays.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation. It is also possible to prepare the mixtures in other conventional manners, for example by using pre-mixtures, for example homologue mixtures, or using so-called "multi-bottle" systems.

The dielectrics may also comprise further additives known to the person skilled in the art and described in the literature. For example, 0–15% by weight, preferably 0–10% by weight, of pleochroic dyes and/or chiral dopants can be added. The additives are each employed in concentrations of from 0.01 to 6% by weight, preferably from 0.1 to 3% by weight. However, the concentration data for the other constituents of the liquid-crystal mixtures, i.e. of the liquid-crystalline or mesogenic compounds, are given without taking into account the concentration of these additives.

The examples which follow illustrate the invention:

EXAMPLES 1 AND 2 AND COMPARATIVE EXAMPLE

Liquid-crystal mixtures having the compositions indicated were prepared. The following measurements were carried out on these mixtures:

temperature of the smectic-nematic phase transition S→N [°C.];

clearing point [°C.];

optical anisotropy Δn at 589 nm and 20° C.;

rotational viscosity $\gamma_1$ at 20° C. [mPa.s];

voltages $V_{10}$, $V_{50}$ and $V_{90}$ for 10%, 50% and 90% transmission, respectively, in viewing direction perpendicular to the plate surface at 20° C. [V];

dielectric anisotropy Δ∈ at 1 kHz and 20° C.;

initial voltage holding ratio VHR [dimensionless]

voltage holding ratio after UV exposure $VHR_{UV}$ [dimensionless]

The measurements were carried out as described in "Merck Liquid Crystals, Physical Properties of Liquids Crystals, Description of the Measurement Methods", ed. Dr. Werner Becker, Merck KGaA, November 1997.

The electro-optical data were measured in a TN cell in the 1st minimum (d·Δn=0.5 μm) at 20° C.

The voltage holding ratio after UV exposure was measured as follows: a VHR test cell filled with the mixture in question is irradiated for 2 h in a "Suntest" apparatus from Xenotest at maximum irradiation intensity of 765 W/m² using a UV speciality glass filter for "outdoor" simulation. The distance between the lamp axis and the sample is about 23 cm. Subsequently the VHR is measured.

Example 1

| Component | [% by weight] | | |
|---|---|---|---|
| CC-3-V | 11.0 | clearing point: | 76.0° C. |
| PP-1-2V1 | 4.0 | Δn: | 0.1489 |
| CGU-2-F | 4.0 | Δε: | 11.0 |
| PGU-2-F | 11.0 | $\gamma_1$: | 120 mPa · s |
| PGU-3-F | 11.0 | d · Δn: | 0.50 μm |
| PGU-5-F | 9.0 | $VHR_0$: | 99.3% |
| CGZP-2-OCF₃ | 9.0 | $VHR_{uv}$: | 74.0% |
| CGZP-3-OCF₃ | 8.0 | | |
| CPU-3-F | 14.0 | | |
| PGIGI-3-F | 4.0 | | |
| CPP-3-2 | 3.0 | | |
| CCP-V-1 | 12.0 | | |
| Σ | 100.0 | | |

Example 2

| Component | [% by weight] | | |
|---|---|---|---|
| PP-1-2V1 | 9.0 | clearing point: | 72.0° C. |
| CC-3-V | 14.0 | Δn: | 0.1464 |
| PGU-2-F | 11.0 | Δε: | 10.5 |
| PGU-3-F | 11.0 | $\gamma_1$: | 87 mPa · s |
| PGU-5-F | 9.0 | d · Δn: | 0.50 μm |
| CGU-3-F | 10.0 | | |
| CGZP-2-OCF₃ | 8.0 | | |
| CGZP-3-OCF₃ | 7.0 | | |
| CPU-3-F | 7.0 | | |
| CCP-V-1 | 10.0 | | |
| CPP-3-2 | 1.5 | | |
| CPPC-3-3 | 2.5 | | |
| Σ | 100.0 | | |

Comparative Example

| Component 1 | [% by weight] | | |
|---|---|---|---|
| PPTUI-3-2 * | 14.0 | clearing point: | 76.5° C. |
| CGU-2-F | 11.0 | 66 n: | 0.1516 |
| CGU-3-F | 11.0 | Δε: | 9.7 |
| CGU-5-F | 9.0 | γ$_1$: | 119 mPa · s |
| CPU-3-F | 15.0 | d · Δn: | 0.50 μm |
| COP-V-1 | 11.0 | VHR$_o$: | 99.4% |
| CC-5-V | 11.0 | VHR$_{uv}$: | 70.0% |
| Cp-3-V1 | 5.0 | | |
| PGU-2-F | 6.0 | | |
| PGU-3-F | 5.0 | | |
| CP-3-O1 ** | 2.0 | | |
| Σ | 100.0 | | |

Note:

*:

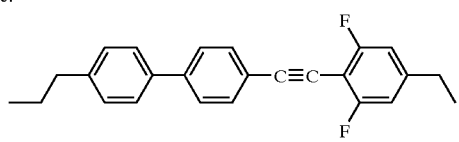

**:

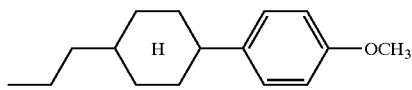

Comparison of Example 1 with the Comparative Example shows that the clearing point, Δn, Δ∈ and γ$_1$ values are comparable but the UV stability of the liquid-crystal mixtures according to the invention is significantly better.

Example 3

| Component | [% by weight] | | |
|---|---|---|---|
| CCP-20CF3 | 8.0 | clearing point: | 80.0° C. |
| CCP-30CF3 | 8.0 | T(S.N) | <−30.0° C. |
| CCP-40CF3 | 6.0 | n$_e$: | 1.5825 |
| CCP-2F.F.F | 10.0 | Δn: | 0.1017 |
| CGU-2-F | 8.0 | | |
| PGU-2-F | 8.0 | | |
| PGU-3-F | 7.0 | | |
| CCZU-2-F | 4.0 | | |
| CCZU-3-F | 14.0 | | |
| CCZU-5-F | 4.0 | | |
| CC-35 | 5.0 | | |
| CC-3-V1 | 13.0 | | |
| PP-1-2V1 | 5.0 | | |
| Σ | 100.0 | | |

Example 4

| Component | [% by weight] | | |
|---|---|---|---|
| CCP-20CF3 | 8.0 | clearing point: | 80.0° C. |
| CCP-30CF3 | 8.0 | n$_e$: | 1.5874 |
| CCP-40CF3 | 6.0 | Δn: | 0.1044 |
| CCP-3F.F.F | 5.0 | Twist: | 90.0° C. |
| CGU-2-F | 8.0 | d · Δn: | 0.50 μm |
| CGU-3-F | 7.0 | V$_{10}$: | 1.34 V |
| PGU-2-F | 5.0 | V$_{50}$: | 1.64 V |
| CCZU-2-F | 4.0 | V$_{90}$: | 2.02 V |
| CCZU-3-F | 14.0 | | |

-continued

| Component | [% by weight] |
|---|---|
| CCZU-5-F | 2.0 |
| CCH-35 | 2.0 |
| CC-3-V1 | 13.0 |
| PP-1-2V1 | 6.0 |
| CPU-3-F | 12.0 |
| Σ | 100.0 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure[s] of all applications, patents and publications, cited herein and of corresponding German Application No. 102 04 607.7, filed Feb. 5, 2002 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Liquid-crystalline medium comprising the compound of the formula (I):

(I)

2. Liquid-crystalline medium according to claim 1, comprising from 1 to 30% by weight of the compound of the formula (I).

3. Liquid-crystalline medium according to claim 1, comprising:

a) from 3 to 10% by weight of compounds of the formula (I), b) additionally, from 10 to 50% by weight of one or more compounds of the formula (II):

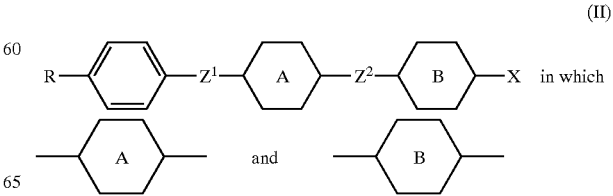

(II)

in which are each, independently of one another,

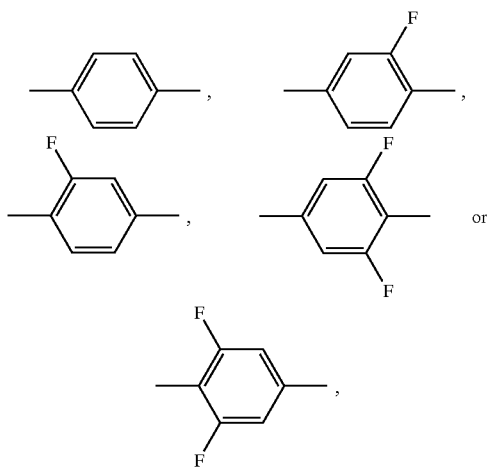

$Z^1$, $Z^2$ are each, independently of one another, a single bond, —CH$_2$—CH$_2$—, CF$_2$CF$_2$, —COO— or —CF$_2$O—, X is F, Cl, —OCF$_3$ or —OCF$_2$CF$_3$, and R is H or an alkyl or alkenyl radical having 1 to 15 carbon atoms and 2 to 15 carbon atoms, respectively, which is unsubstituted, monosubstituted by —CN or a —CF$_3$ or at least monosubstituted by halogen, where one or more —CH$_2$— groups in these radicals may, in each case independently of one another, be replaced by —O—, —S—,

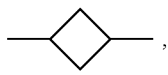

—CO—, —COO—, —OCO— or —OCOO— in such a way that O atoms are not linked directly to one another, c) additionally, from 10 to 50% by weight of one or more compounds of the formula (III), and/or (IV):

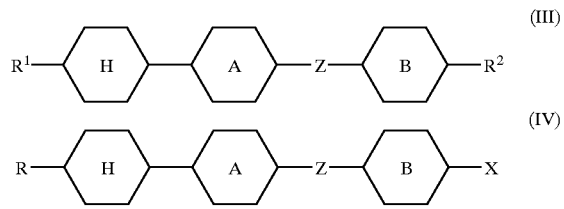

in which

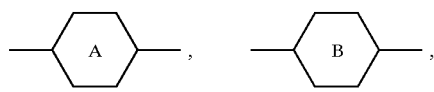

R and X are as defined above, R$^1$ and R$^2$ are each independently as defined for R, and Z is as defined for $Z^1$, d) additionally, from 10 to 40% by weight of one or more compounds of the formulae (V) and/or (VI):

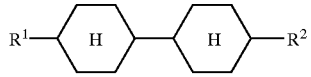

in which R$^1$ and R$^2$ are as defined above, and e) optionally additionally, from 0 to 15% by weight of one or more further liquid-crystalline compounds.

4. Liquid-crystalline medium according to claim 3, wherein, in the compound of formula (II):

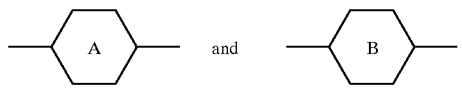

are each, independently of one another,

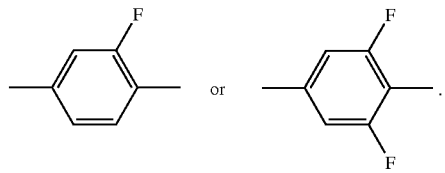

5. Liquid-crystalline medium according to claim 3, wherein, in the compound of formula (II), at least one of the groups $Z^1$ or $Z^2$ is a single bond.

6. Liquid-crystalline medium according to claim 1, further comprising one or more compounds of the formulae (IIa) and/or (IIb):

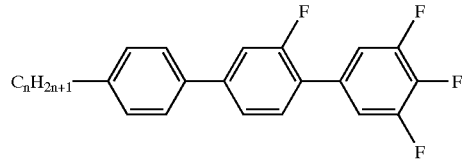

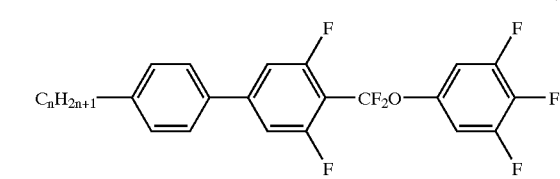

where n = 1 to 7.

7. Liquid-crystalline medium according to claim 1, further comprising one or more compounds of the formulae (IVa) to (IVd):

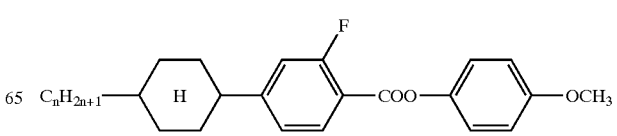

-continued

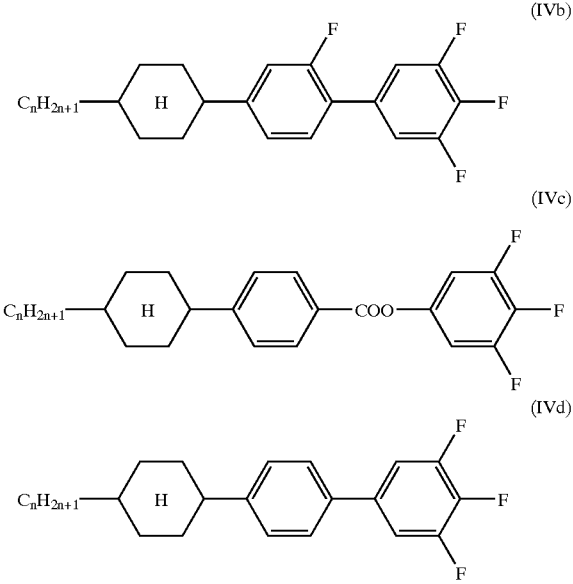

where n = 1 to 7.

8. Liquid-crystalline medium according to claim 1, further comprising one or more compounds of the formulae (Va) and/or (VIa):

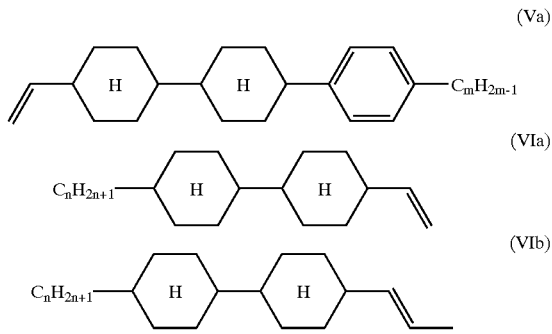

where n,m = 1 to 7.

9. Liquid-crystalline medium according to claim 3, comprising
   a) from 3 to 10% by weight of compounds of the formula (I),
   b) additionally, from 25 to 40% by weight of compounds of the formula (II),
   c) additionally, from 30 to 45% by weight of compounds of the formula (III) and/or (IV),
   d) additionally, from 18 to 30% by weight of compounds of the formulae (V) and/or (VI), and
   e) optionally additionally, from 0 to 10% by weight of further liquid-crystalline compounds.

10. Liquid-crystalline medium according to claim 6, which comprises at least 50% by weight of one or more compounds of the formulae (IIa) and/or (IIb).

11. Liquid-crystalline medium according to claim 10, which comprises at least 50% by weight of one or more compounds of the formula (IIa).

12. Liquid-crystalline medium according to claim 7, which comprises at least 50% by weight of one or more compounds of the formulae (IVa) to (IVd).

13. Liquid-crystalline medium according to claim 8, which comprises at least 50% by weight of one or more compounds of the formulae (Va), (VIa) and/or (VIb).

14. Electro-optical display element containing a liquid-crystalline medium according to claim 1.

15. Liquid-crystalline medium according to claim 1, comprising from 2 to 20% by weight of the compound of the formula (I).

16. Liquid-crystalline medium according to claim 1, comprising from 3 to 10% by weight of the compound of the formula (I).

17. Liquid-crystalline medium according to claim 3, wherein, in the compound of formula (II), both groups $Z^1$ or $Z^2$ are a single bond.

18. Liquid-crystalline medium according to claim 6, which comprises at least 80% by weight of one or more compounds of the formulae (IIa) and/or (IIb).

19. Liquid-crystalline medium according to claim 10, which comprises at least 80% by weight of one or more compounds of the formula (IIa).

20. Liquid-crystalline medium according to claim 7, which comprises at least 80% by weight of one or more compounds of the formulae (IVa) to (IVd).

21. Liquid-crystalline medium according to claim 8, which comprises at least 80% by weight of one or more compounds of the formulae (Va), (VIa) and/or (VIb).

22. An electro-optical display element according to claim 14, which is an in IPS display element.

23. An electro-optical display element according to claim 22, which has a layer thickness of from 2 to 3 $\mu$m.

* * * * *